(12) United States Patent
Ben-David et al.

(10) Patent No.: US 6,870,523 B1
(45) Date of Patent: Mar. 22, 2005

(54) DEVICE, SYSTEM AND METHOD FOR ELECTRONIC TRUE COLOR DISPLAY

(75) Inventors: Ilan Ben-David, Rosh Hayin (IL); Moshe Ben-Chorin, Rehovot (IL)

(73) Assignee: Genoa Color Technologies, Herzliya (IL)

( * ) Notice: Subject to any disclaimer, the term of this patent is extended or adjusted under 35 U.S.C. 154(b) by 0 days.

(21) Appl. No.: 09/710,895

(22) Filed: Nov. 14, 2000

Related U.S. Application Data

(60) Provisional application No. 60/209,771, filed on Jun. 7, 2000.

(51) Int. Cl.[7] .................................................. G09G 3/34
(52) U.S. Cl. .......................... 345/84; 345/32; 348/743; 348/744
(58) Field of Search ........................... 345/84, 85, 691, 345/697, 32; 349/5, 106, 108; 348/743, 544

(56) References Cited

U.S. PATENT DOCUMENTS 3,699,244 A * 10/1972 Cohen et al. ................ 348/121
4,390,893 A    6/1983 Russell et al.

(List continued on next page.)

FOREIGN PATENT DOCUMENTS

| WO | 95/10160 | 10/1994 |
|----|----------|---------|
| WO | 97/42770 | 5/1997  |

OTHER PUBLICATIONS

K. Takatori et al,"Field–Sequential Smectic LCD with TFT Pixel Amplifier", SID 01 Digest, pp. 48–51.

Jeffrey A. Shimizu, "Scrolling Color LCOS for HDTV Rear Projection, "SID 01 Digest, pp. 1072–1075.

Francisco H. Imai, ColorScience; "Spectral reproduction from scene to hardcopy", Part 1–Multi-spectral acquisition and spectral estimation using a Trichromatic Digital Camera System associated with absorption filters.

Wyble & Berns, "A Critical Review of Spectral Models Applied to Binary Color Printing", vol. 25 No. 1.

Rosen et al Spectral Reproduction from Scene to Hardcopy II: Image Processing. Munsell Color Science Laboratory, RIT Proceedings of SPIE vol. 4300(2001).

(List continued on next page.)

*Primary Examiner*—Jimmy H. Nguyen
(74) *Attorney, Agent, or Firm*—Eitan, Pearl, Latzer & Cohen Zedek, LLP

(57) ABSTRACT

A device, system and a method for displaying an expanded spectrum of colors. The present invention is suitable for various types of electronic display devices, such as televisions and monitor devices ("monitors") for computational devices, for example. The present invention operates by electronic production of more than three primary colors. As previously described, the term "primary color" specifically does not include light as produced by a neutral filter. Thus, unlike background art systems and devices, the present invention is not limited to combinations of colors which are produced from only three primary colors, such as red, green and blue for example.

24 Claims, 10 Drawing Sheets

U.S. PATENT DOCUMENTS

| | | | |
|---|---|---|---|
| 4,751,535 A | | 6/1988 | Myers |
| 4,800,375 A | | 1/1989 | Silverstein et al. .......... 340/703 |
| 4,843,381 A | | 6/1989 | Baron |
| 4,843,573 A | | 6/1989 | Taylor et al. |
| 4,892,391 A | | 1/1990 | Stewart et al. |
| 4,985,853 A | | 1/1991 | Taylor et al. |
| 5,042,921 A | * | 8/1991 | Sato et al. ...................... 349/9 |
| 5,233,385 A | | 8/1993 | Sampsell ...................... 355/35 |
| 5,416,890 A | | 5/1995 | Beretta |
| 5,455,600 A | | 10/1995 | Friedman et al. |
| 5,592,188 A | | 1/1997 | Doherty et al. ............... 345/84 |
| 5,631,734 A | | 5/1997 | Stern et al. |
| 5,650,942 A | | 7/1997 | Granger |
| 5,657,036 A | * | 8/1997 | Markandey et al. .......... 345/85 |
| 5,751,385 A | | 5/1998 | Heinze |
| 5,863,125 A | | 1/1999 | Doany |
| 5,870,530 A | | 2/1999 | Balasubramanian |
| 5,872,898 A | | 2/1999 | Mahy |
| 5,892,891 A | | 4/1999 | Dalal et al. |
| 5,982,541 A | | 11/1999 | Li et al. |
| 5,999,153 A | | 12/1999 | Lind et al. |
| 6,018,237 A | | 1/2000 | Havel |
| 6,072,464 A | | 6/2000 | Ozeki |
| 6,097,367 A | | 8/2000 | Kuriwaki et al. ........... 345/150 |
| 6,144,420 A | | 11/2000 | Jung |
| 6,147,720 A | * | 11/2000 | Guerinot et al. ............ 348/743 |
| 6,198,512 B1 | | 3/2001 | Harris |
| 6,220,710 B1 | | 4/2001 | Raj et al. |
| 6,231,190 B1 | | 5/2001 | Dewald |
| 6,246,396 B1 | | 6/2001 | Gibson et al. |
| 6,256,073 B1 | * | 7/2001 | Pettitt ......................... 348/742 |
| 6,259,430 B1 | | 7/2001 | Riddle et al. |
| 6,262,710 B1 | * | 7/2001 | Smith .......................... 345/589 |
| 6,262,744 B1 | * | 7/2001 | Carrein ....................... 345/604 |
| 6,280,034 B1 | | 8/2001 | Brennesholtz |
| 6,324,006 B1 | * | 11/2001 | Morgan ...................... 348/742 |
| 6,366,291 B1 | | 4/2002 | Taniguchi et al. |
| 6,538,742 B1 | | 3/2003 | Ohsawa |
| 6,633,302 B1 | | 10/2003 | Ohsawa et al. |

OTHER PUBLICATIONS

Gunter Wyszecki & W.S. Stiles, Color Science; Concepts and Methods, Quantitative Data and Formulae, 2d. Ed, 1982, pp. 179–183.

Ajito et al, "Expanded Color Gamut Reproduced by Six–Primary Projection Display", *Proc. SPIE*, vol. 3954 (2000) pp 130–137.

Ajito et al, "Multiprimary Color Display for Liquid Crystal Display Projectors Using Diffraction Grating", *Optical Eng..*, 38(11):1883–1888, (1999).

* cited by examiner

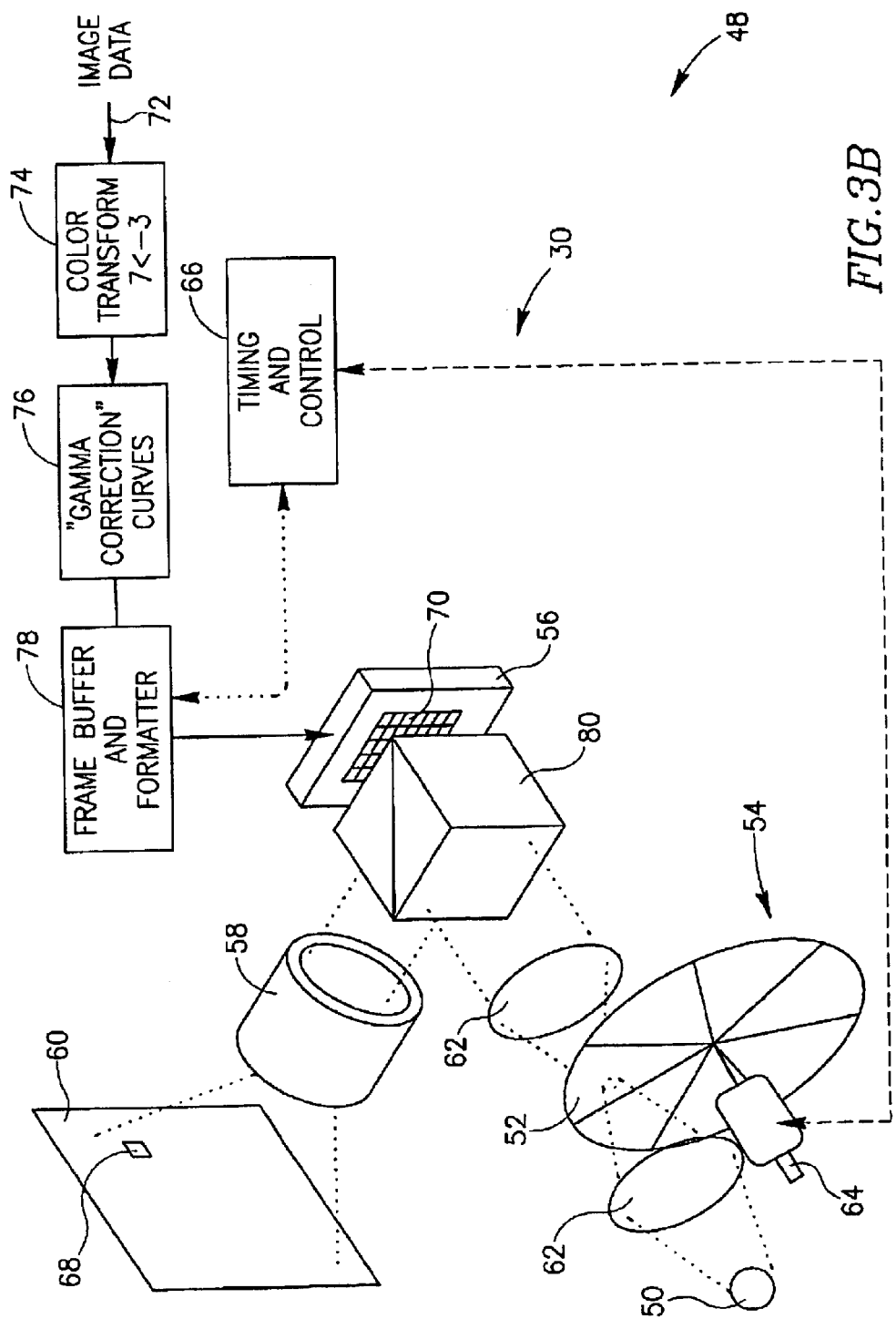

DEVICE, SYSTEM AND METHOD FOR ELECTRONIC TRUE COLOR DISPLAY

This application claims priority from U.S. Provisional Patent Application No. 60/209,771, filed Jun. 7, 2000, entitled "A High Gamut Video Display", which is incorporated herein by reference in its entirety.

FIELD AND BACKGROUND OF THE INVENTION

The present invention relates to a device, system and a method for electronic true color display, and in particular, to such a device, system and method in which an expanded color space is available for display through an electronic display device such as a monitor of a computational device, for example.

The perception of color by human vision involves the impact of light of different wavelengths in the visible spectrum (400 nm–780 nm) on the human eye, and the processing of the resultant signals by the human brain. For example, in order for an individual to perceive an object as "red", light in the range of wavelengths of about 580–780 nm must be reflected from the object onto the retina of the eye of the individual. Depending upon the spectral distribution of the light and assuming normal color vision, the individual perceives different colors from a wide range of such colors.

In addition, the individual perceives various characteristics of the color. The color itself is also termed the "hue". In addition, saturation determines the intensity of the color, such that a color shade which is saturated is perceived as highly vivid, while a pastel version of the same color is less saturated. The combination of hue and saturation forms the chrominance of the color. As perceived by the individual, color also has brightness, which is the apparent or perceived energy of the color, such that the color "black" is actually the absence of brightness for any color.

Although color is a complex combination of physical and physiological phenomena, as previously described, color matches to viewable colors can be obtained with combinations of only three colors, usually red, green and blue. These three colors are the additive primaries. By combining different amounts of each color, a wide spectrum of colors can be produced. Unfortunately, this spectrum still falls short of the complete spectrum of colors which are visible to the human eye (see for example www.barco.com as of Sep. 28, 2000). Not every color can be expressed as a mixture of three primary colors in combination. Instead, certain colors can only be adequately represented mathematically if the value for one or more primary colors is negative. While such negative values are theoretically possible, physical devices cannot produce them.

An international standards body, CIE (Commission Internationale de l'Eclairage), has defined a special set of imaginary primaries, for which all colors can be represented by positive values. The primaries are imaginary in the sense that they are a mathematical creation, which cannot be produced by a physical device. Nevertheless, the system is very useful for the presentation of color, as is described below.

The system is defined by the color matching functions, $X(\lambda), Y(\lambda)$ and $Z(\lambda)$, which define the response of the primaries to a monochromatic excitation of wavelength, $\lambda$. Furthermore, $Y(\lambda)$ is chosen to be identical to the brightness sensitivity of the color sensors in the human eye. Using these primaries, each color can be represented by three positive values XYZ, where Y is proportional to the brightness of the excitation. From the XYZ values a normalized set xyz is created, by dividing each of the values by X+Y+Z. In the new set x+y+z=1, thereby enabling the third value to be derived from these values, such that a color is represented by a set of x and y values on a chromaticity diagram as shown in Background Art FIG. 1. Information which is lost in the process of normalization is the brightness of the color, but all chromatic information is kept.

The chromaticity diagram in FIG. 1 describes a closed area in a shape of horseshoe in the xy space. The points on the border of the horseshoe (shown as line 10), known as the spectrum locus, are the xy values corresponding to monochromatic excitations in the range from 400 nm to 780 nm as marked. A straight line 12, closing the horseshoe from below, between the extreme monochromatic excitation at the long and short wavelengths, is named the purple line. The white point, which is the point at which the human eye perceives the color "white", is lying inside the closed area. All colors discernible by human eye are inside this closed area, which is called the color gamut of the eye. If an excitation is monochromatic, it is placed on the horseshoe border. If it is spectrally wide, thereby containing light of a plurality of spectra, its coordinates lie inside the gamut.

The electronic reproduction of color, for example by an electronic display device such as a computer monitor, is currently performed by using three primaries: red, green and blue. These systems cannot display the full range of colors which are available to the human eye. The reason for the inability of such devices to display the full range of colors perceived by the human eye is that some colors are presented by negative values of one or more of the primaries, which cannot be realized by a physical light source. Certain background art devices and systems use a fourth "color", which is actually light passed through a neutral filter, or "white light", and which is used for controlling brightness of the displayed color, as described for example with regard to U.S. Pat. No. 5,233,385. However, the use of the neutral filter does not affect the ultimate spectrum of colors which can be displayed.

Electronic display devices which operate according to the three-primary red, green, blue system include such devices as computer monitors, televisions, computational presentation devices, electronic outdoor color displays and other such devices. The mechanism for color display may use various devices, such as Cathode Ray Tubes (CRT), Liquid Crystal Displays (LCD), plasma display devices, Light Emitting Diodes (LED) and three-color projection devices for presentations and display of video data on a large screen, for example.

As an example of the operation of such a device, CRT displays contain pixels with three different phosphors, emitting red, green and blue light upon excitation. In currently available displays, the video signal sent to the display specifies the three RGB color coordinates (or some functions of these coordinates) for each of the pixels. Each coordinate represents the strength of excitation of the relevant phosphor. An individual viewing the display integrates the light coming from neighboring colored pixels to get a sensation of the required color. The process of integration is automatically performed, without individual awareness of the process, and occurs through a combination of the physiological activity of the eye itself and of processing of signals from the eye by the brain.

The red, green and blue emissions of the phosphors define three points in the xy plane. The points marked 14, 16 and 18 in FIG. 2 represent red, green and blue phosphors respectively of a typical phosphor set used for televisions and related devices. As can be seen in FIG. 2, these points 14, 16 and 18 lie inside the spectral gamut of the eye, which is the range of spectral values for light visible to the human eye. Many colors can be created using these primaries. However, not all colors can be created, as previously described, since only positive values of RGB are possible. These positive combinations represent colors which are inside a triangle 20, created by the three primaries, as can be easily seen from FIG. 2. However, a significant portion of the gamut of the eye lies outside triangle 20, and therefore cannot be displayed by using the three phosphors system.

Part of this problem could be alleviated by using lasers or other spectrally narrow light, since the emission of the phosphors is spectrally wide, thereby causing the triangle of values lying within the gamut of produced colors to be even smaller. A similar problem is found with LCD display devices which operate with "white" light passed through color filters, and which must also have a wide spectrum for the filters in order for enough light to pass through the filter. However, the problem of the restricted gamut for display of colors cannot be solved by using monochromatic light sources, such as lasers; although the triangle created is much larger, large parts of the gamut of the human eye still cannot be displayed with only three primary colors, regardless of the type of light source.

A more useful solution would enable a wider range of colors to be displayed by the electronic display device, for example by a television or a computer monitor. Such a solution would be efficient and would be suitable for both large electronic display devices and more small, portable devices. Attempts to define such a solution can be found, for example, in PCT Application Nos. WO 97/42770 and WO 95/10160, which both describe methods for processing image data for display with four or more primary colors. However, neither Application teaches or suggests a device which is capable of such a display of four or more primary colors.

U.S. Pat. Nos. 4,800,375 and 6,097,367 both describe attempts to provide such devices. However, neither disclosed device is a suitable solution to this problem, as both devices have significant disadvantages. For example, U.S. Pat. No. 4,800,375 describes a flat, backlighted screen, in which the light source and controller form a single unit. However, since each pixel has a different color, increasing the number of primary colors both increases the cost of production, since additional light source/controller units must be added for each color, and also decreases the resolution of the screen. Similar problems are also found with the disclosed device of U.S. Pat. No. 6,097,367, which is based on LED (light emitting diodes). Thus, these disclosed background art devices clearly suffer from significant drawbacks, particularly with regard to the decreased resolution of the displayed image as the number of primary colors which form the image is increased.

Therefore, there is an unmet need for, and it would be highly useful to have, a device, system and a method for providing an expanded color spectrum for the electronic display and reproduction of color, which would operate efficiently and which would be suitable for display devices of different sizes, and which would not result in decreased resolution of the displayed image as the number of primary colors is increased.

SUMMARY OF THE INVENTION

The present invention is of a device, system and a method for displaying an expanded spectrum of colors. The present invention is suitable for various types of electronic display devices, such as televisions and monitor devices ("monitors") for computational devices, for example. The present invention operates by using more than three primary colors. As previously described, the term "primary color" specifically does not include light from a white or polychromatic light source after only being passed through a neutral filter. Thus, unlike background art systems and devices, the present invention is not limited to combinations of colors which are produced from only three primary colors, such as red, green and blue for example.

According to the present invention, there is provided a device for displaying image data of a plurality of colors, the device comprising: (a) a light source for producing light having at least four primary colors; (b) a controller for determining a combination of at least one of the at least four primary colors according to the image data for production by the light source, such that the controller is separate from the light source; and (c) a viewing screen for displaying the image data according to the combination from the controller.

According to another embodiment of the present invention, there is provided a system for displaying image data of a plurality of colors, the system comprising: (a) a light source for producing light having at least four primary colors; (b) a converter for converting the image data to a combination of at least one of the at least four primary colors to form a map; (c) a controller for controlling a production of the combination from the light source, wherein the controller is separate from the light source; and (d) a viewing screen for displaying the image data from the combination from the light source as controlled by the controller.

According to yet another embodiment of the present invention, in a device for displaying image data of a plurality of colors, the device comprising a light source for producing light having at least four primary colors and a viewing screen for displaying the image, the light being projected onto the viewing screen, there is provided a method for creating the image for displaying, the method comprising the steps of: (a) producing light by the light source of at least four primary colors; (b) determining a path for light of each primary color according to the image data; and (c) projecting the light of each primary color according to the path onto the viewing screen to form the image.

Hereinafter, the term "neutral" refers to light having a spectral distribution, which does not differ substantially from that of a white light source, as obtained for example by passing light from such a white source through a neutral density filter.

BRIEF DESCRIPTION OF THE DRAWINGS

The invention is herein described, by way of example only, with reference to the accompanying drawings, wherein:

FIGS. 3A and 3B are schematic block diagrams of two embodiments of an exemplary display device and system according to the present invention;

DESCRIPTION OF THE PREFERRED EMBODIMENTS

Figure 1:
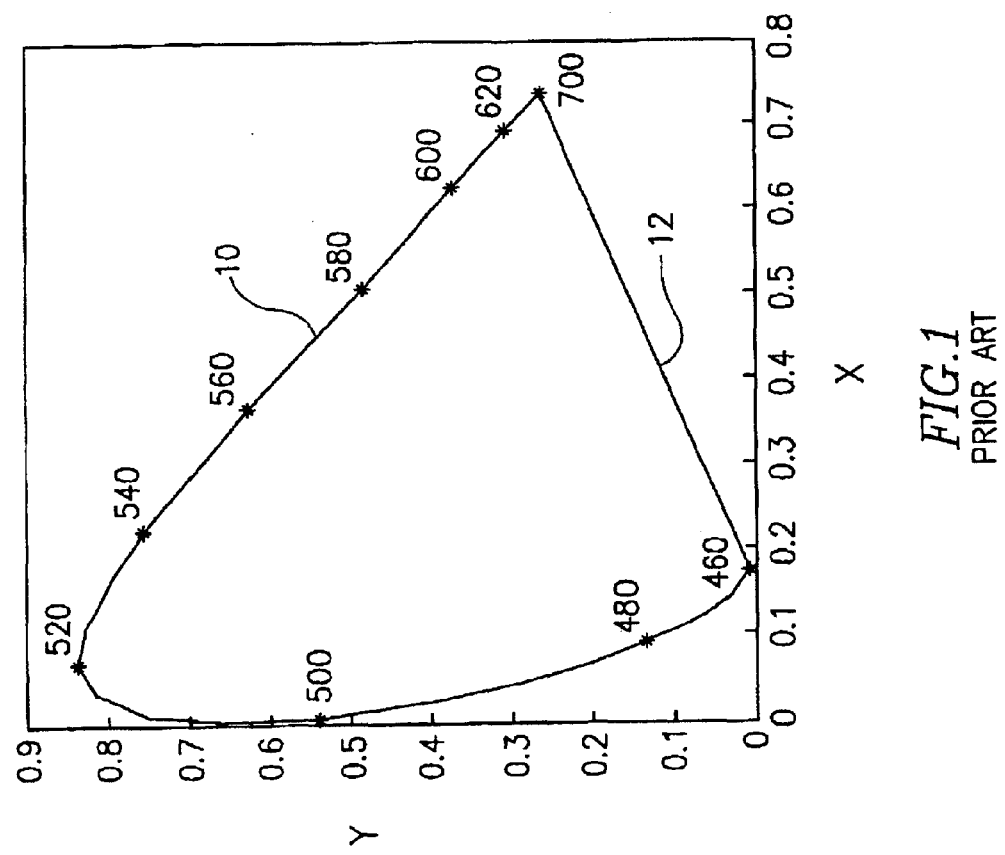
FIG. 1 is a Background Art chromaticity diagram.

The present invention is of a device, system and a method for displaying an expanded spectrum of colors. The present invention is suitable for various types of electronic display devices, such as televisions and monitor devices ("monitors") for computational devices, for example. The present invention operates by using more than three primary colors. As previously described, the term "primary color" specifically does not include light from a white or polychromatic light source after only being passed through a neutral filter. Thus, unlike background art systems and devices, the present invention is not limited to combinations of colors which are produced from only three primary colors, such as red, green and blue for example.

According to preferred embodiments of the present invention, light from six primary colors is used, although of course any number of primary colors is operative with the present invention, as long as at least four such primary colors are included. The use of six primary colors is preferred since the gamut which is covered by the resulting hexagon is much larger than the triangle 20 which is produced by RGB phosphors, for example, yet can still be efficiently produced as part of an electronic color display, as explained in greater detail with regard to the preferred embodiment below. As shown as a hexagon 22 with regard to FIG. 2, with points 24, 26, 28, 30, 32 and 34, the gamut of colors provided by such a combination of primary colors is clearly much larger than the simple triangle 20 which is produced by RGB phosphors. A description of an exemplary but preferred embodiment for the method for selecting the spectra for such primary colors is provided with regard to FIGS. 5A and 5B below.

With regard to the type of light source, or device for producing light for each primary color, different types of sources and/or mechanisms could optionally be used with the present invention. Optionally and preferably, in order to obtain the best coverage of the gamut, the light for each primary color should preferably be monochromatic. Of course, lasers could optionally be used as the source of light for the primary colors for the present invention. Monochromatic excitation can also optionally be produced by passing white light through a narrow spectral filter. However, as the spectral bandwidth of the excitation is limited, the brightness of the resultant light becomes lower (assuming that the brightness of the source stays the same). On the other hand, as the spectrum of the primary excitation becomes wider, the resultant color gamut for the electronic color display becomes more restricted. Therefore, the interplay between the purity and the brightness of the primaries should be considered, assuming that lasers are not used as the source of monochromatic light.

In addition, various display mechanisms are optionally used with the present invention, which also affect the choice of light source and/or device for production of the primary colors. The preferred display mechanism is projection of light onto the viewing screen, for an optical projection system. Projection displays can work simultaneously, in which light of all colors illuminates the viewing screen at the same time; or sequentially, in which light of the different colors illuminates the screen one after another. For the latter type of display, the vision system of the human eye perceives combined colors through temporal integration, as the sequential display of colors is performed sufficiently rapidly.

Display systems of the second type are based on spatially modulating colored light and projecting it on a display screen. The spatial modulation can optionally be performed by using a liquid crystal spatial modulator, in which case a source of polarized light should be used, or alternatively by a deformable micro-mirror device (DMD) produced by Texas Instruments (USA) for example, which allows the use of non-polarized light. Of course other types of devices for performing spatial modulation are optionally used, and are encompassed by the scope of the present invention.

The spatial modulation can optionally be done with analog or binary levels or gradations, according to the type of modulator device which is used. Nematic liquid crystal modulators, for example by CRL Opto (United Kingdom), or Kopin Inc. (USA), allow for analog "gray levels", while Ferroelectric liquid crystal modulators, such as from Micropix Technologies (United Kingdom) or LightCaster™ from Displaytech (USA), and DMD are binary devices. If a binary modulator device is used for spatial modulation, "gray levels" are achieved by controlling the duration of the illumination, and/or the intensity of the light, incident on the spatial modulator.

Light production mechanisms based on optical projection are preferred over those mechanisms which are based on light emission at the screen or other portion of the display device. Examples of light emission mechanisms include CRT, field emission and plasma displays, in which the phosphors at the screen or other device actually emit the light; LED screens in which small electro-luminescent diodes emit the light; and flat LCD screens in which each of the pixels has an individual color filter. In these systems, physically small emitters of different primary colors, which therefore produce a small, focused point of colored light, are placed in close vicinity. The eye then automatically integrates the emitted light from neighboring pixels to obtain the color sensation.

However, these light emission systems suffer from a number of disadvantages. First, the addition of primary colors decreases the resolution of the display, unlike for optical projection mechanisms, in which the addition of primary colors does not affect the resolution of the display. Second, adaptation of the pixel matrix is required in order for the display screen to be able to display more than three colors. For CRT and LED mechanisms, special phosphors and diodes, respectively, must be developed. For LCD displays, the set of color filters must be adapted, in order to provide four or more primary colors through these filters. All of these adaptations require the addition of extra units, such as extra phosphors or extra diodes, which therefore increases the cost of the system in order to be able to display more colors. By contrast, as described in greater detail below, the adaptations which are required for optical projection systems are relatively minor, and do not result in increased cost for the system. Thus, optical projection systems are clearly preferred over light emission systems.

The principles and operation of the device, system and method according to the present invention may be better understood with reference to the drawings and the accompanying description.

Figure 3A:
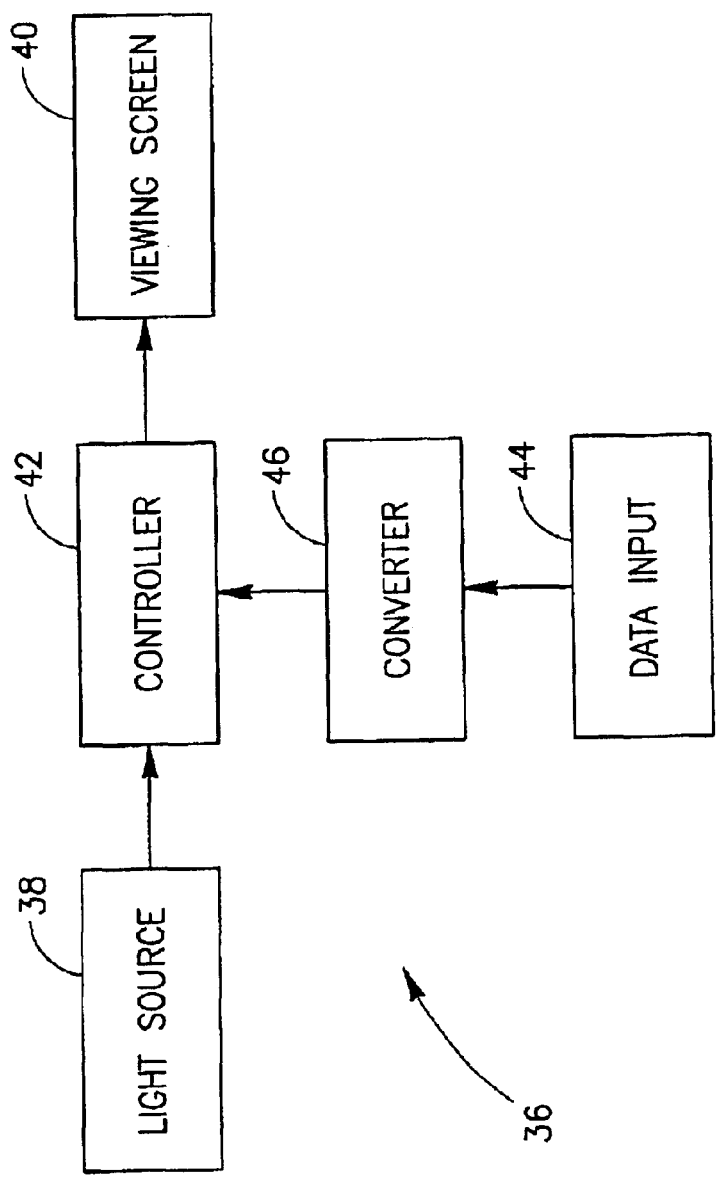

Referring now to the drawings, FIGS. 3A and 3B are schematic block diagrams of two embodiments of an exemplary display device and system for displaying at least four primary colors according to the present invention. FIG. 3A shows a basic embodiment of the exemplary display device and system, while FIG. 3B shows a preferred embodiment featuring a light projection mechanism.

As shown in FIG. 3A, a system 36 features a light source 38 for producing light of at least four primary colors. The light from light source 38 is displayed on a viewing screen 40, thereby enabling the human viewer to see the colors of the displayed image (not shown). Preferably, the light from light source 38 is projected onto viewing screen 40. In order for each color to be properly displayed in the correct location of the displayed image, a controller 42 controls the production of light of each color, such that the correct light is shown at the correct location of viewing screen 40. Preferably, controller 42 is separate from light source 38, such that these two components are not combined into a single component.

Optionally and more preferably, for the preferred projection embodiment of system 36, light source 38 projects light of at least four colors, without being able to control the location of the projected light onto viewing screen 40. Controller 42 then determines the relative location of light of each color as projected onto viewing screen 40, for example with a spatial light modulator and/or another system of mirrors and/or lenses, as described in greater detail below with regard to FIGS. 3B and 7.

In order for controller 42 to be able to determine the correct light for being displayed at each portion of viewing screen 40, controller 42 optionally and more preferably receives data from a data input 44, which ay optionally be digital or analog. Most preferably, controller 42 also receives instructions and/or commands from a converter 46, which lies between data input 44 and controller 42. Converter 46 converts the data from data input 44 into a format which is suitable for controller 42, and also includes any necessary instructions and/or commands for enabling controller 42 to be able to understand the data. Optionally, converter 46 may also convert the data from an analog signal to digital data, such that controller 42 is only required to receive digital data.

FIG. 3B shows a second embodiment of an exemplary display device according to the present invention, which is based on a sequential light projection system, similar to that suggested in U.S. Pat. No. 5,592,188. However, it should be noted that the present invention extends the suggested background art system to four or more primary colors, while the background art system is limited to electronic color displays which use only three primary colors. In addition, this embodiment of the present invention is only illustrative and is not intended to be limiting in any way.

A system 48 is based on passing white light from a source 50 through appropriate color filters 52 to form colored light of a defined spectral range.

As previously described, preferably system 48 features six such colored filters 52, which as shown may optionally be configured in a color filter wheel 54. In this example, the combination of light source 50 and color filters 52 can be considered to form at least part of the light source of FIG. 3A above, optionally with other components involved in the production of the light itself.

This colored light then illuminates a spatially modulated mask 56, also known as an SLM (spatial light modulator) which determines the particular color for being displayed at each portion of the image (typically according to each pixel), by determining whether light of that color is permitted to pass for illuminating that pixel. The colored light for this image is then projected by a projection lens 58 onto a viewing screen 60. Viewing screen 60 displays the resultant colored image to the user (not shown). Spatially modulated mask 56, and more preferably the combination of spatially modulated mask 56 and projection lens 58, can be considered to be an example of the controller from FIG. 3A.

Spatially modulated mask 56 is optionally either a binary modulation type or a continuous modulation type.

Examples of the continuous modulation type include, but are not limited to, polarization rotation devices such as LCD (liquid crystal device), electro-optical modulator and magneto-optical modulator. In these devices, the polarization of the impinging light is rotated. In this context, LCD features an organized structure of anisotropic molecules, for which the axis of anisotropy is rotated by the application of voltage, thereby rotating the polarization. For the electro-optical modulator, anisotropic crystals are featured, which change the rotation of the polarization of the light radiation, due to a change of the refractive index along the different axes, as a result of the applied voltage. The electro-optical modulator can be applied for a continuous, non-binary implementation or for a binary implementation. Magneto-optical modulators are devices in which a magnetic field is used to rotate the polarization, by changing the electro-optical properties of the crystal.

Examples of the binary modulation type include, but are not limited to, DMD, FLC, quantum well modulator and electro-optical modulator. DMD (digital micro-mirror device) is an array of mirrors, each of which has two positions, either reflecting light toward a viewing screen 60, or reflecting light away from viewing screen 60. FLC (ferroelectric liquid crystal) features liquid crystals, which have only two bi-stable orientation states, thereby changing the polarization of the light radiation to one of two states (effectively "on" and "off"). A quantum well modulator is a device in which voltage is applied in a quantum well, which then changes transmission and reflection properties for light by changing the states of the electrons in the well, to one of two levels according to the applied voltage. The electrons are changed from being absorptive to being transmissive.

In order for the light to be directed through the appropriate filter 52, preferably the light is focused by a condenser lens 62, optionally implemented as two such lenses 62 for the purposes of illustration only and without any intention of being limiting. The focussed light is then directed through one of the filters on filter wheel 54. Filter wheel 54 holds at least four color filters 52, the transmission spectra of which is designed to give a coverage of a major portion of the gamut of the eye. A motor 64 optionally and preferably rotates filter wheel 54 in front of light source 50, so in each turn spatially modulated mask 56 is illuminated by all colors in filter wheel 54 sequentially. Preferably, the rate of rotation is at the frame frequency, which is the frequency at which the full-color image on viewing screen 60 is refreshed. Typical frame frequencies (rotation frequencies) are in the range of 30–85 Hz.

More preferably, the loading of the data into spatially modulated mask 56 is synchronized by a timing system 66, according to the rotation of filter wheel 54. The light beam is spatially modulated by spatially modulated mask 56, so that the apparent brightness of each primary color varies at different portions of viewing screen 60, typically according to each pixel of the image. Each position 68 on viewing screen 60 is preferably associated with a certain pixel 70 in spatially modulated mask 56. The brightness of that position is determined by the relevant data pixel in the image. The values for the pixels of the image are optionally and preferably retrieved from an image data file 72. The human viewer integrates the sequential stream of the primary images to obtain a full color image with a wide gamut of colors when viewing the image as projected onto viewing screen 60.

An implementation using liquid crystal modulators requires the use of polarized light. For reflecting devices, such as Liquid Crystal Over Silicon (LCOS) devices, the same polarizer, usually a polarizing cube beam splitter, can be used for polarizing the incident light and for analyzing the reflected light. For transmission devices, such as active matrix LCD based on thin-film-transistor technology (TFT) as provided by Epson, Kopin (USA) and other vendors, for which light passes through the pixilated matrix, linear polarizers are placed before and after spatially modulated mask 56. The exemplary but preferred implementation shown in FIG. 3 is based on a reflecting LCOS device for spatially modulated mask 56, and therefore a polarizing cube beam splitter 80 is included in system 48. It should be noted that this is for the purposes of illustration only, and other implementations of of system 48 are also possible as based on other modulators, such as those devices which are described as examples of other such spatial modulation devices.

An exemplary description of the flow of data and data handling is also shown with regard to FIG. 3B. The data is optionally given as a digital image file 72 as shown, or alternatively as an analog video signal (not shown). The data optionally and typically arrives in a raster format, particularly for display systems associated with computers. The raster format is a signal presenting the R, G and B values of pixel-after-pixel, line-after-line for a full frame. In interlace video, the frame is divided to two fields, which are sent one after the other, the first field containing only the odd lines, and the second field containing the even lines. A typical analog graphics card for a computer monitor receives digital image data, and then sends the image data as analog signals on five lines, three for R, G and B signals and two for synchronization signals. The R, G and B signals are non-linear functions of the RGB value of the relevant pixel in the image. This function (known in the art as a gamma-correction function) is such that the response of a CRT to its outcome is linear on the original pixel value, such that the brightness of the emission from a particular phosphor depends upon the voltage of the received signal. In a video signal, the RGB signals are transformed into other combinations, representing luminance and chrominance of the the pixel, and each of them is encoded separately.

The analog image data is optionally and more preferably transformed into digital data for the purpose of the present invention, for example in order to correct for various effects caused by the video/graphics card interface to obtain digital RGB (three-color) image data 72. Examples of effects for which such correction may optionally and preferably be desired include but are not limited to, effects of analog to digital (A/D) conversion and video decoding, the effect of de-gamma conversion, and the effect of converting from interlace to non-interlace signals. According to preferred embodiments of the present invention, the data is only presented in one field, and not in two or more fields as for the interlaced video of the background art. Therefore, the data is preferably subjected to a transformation such that the data is not interlaced before being sent to the frame buffer, as described in greater detail below.

Digital RGB data can also optionally and more preferably be obtained directly from digital graphic cards, available from ATI, Number Nine Revolution and other vendors.

In any case, the digital RGB image data is then manipulated in a multi-color transformation module 74, as described in greater detail below, into a color format which includes data for each color of color filters 52, with N-bits of data per color (in this case, 7 colors, of which one is white, and 8 bits per color).

The resulting 7 color channels are more preferably subjected to a gamma correction process for the response of spatially modulated mask 56 by a gamma correction module 76. Gamma-correction module 76 performs a non-linear transformation, known as a "de-gamma" process, for each of the data channels. The transformation is preferably non-linear since the incoming data is typically non-linear in order to correct for such effects of components within the system on the signal as the cable to viewing screen 60 (not shown), such that the output of the transformation is preferably linear. Preferably, this transformation is performed by applying several look-up tables (one or more for each channel), which contain the output values corresponding to all possible input values. The use of such look-up tables provides for a standardized, corrected, linear output which can be more precisely displayed with the system of the present invention.

The corrected data is then loaded into a frame buffer and format module 78 which arranges the stream of data in a format consistent with the electronic requirements of spatially modulated mask 56. Frame buffer and format module 78 is a memory device for holding the data of the image. Typically, the data is held in the same geometrical arrangement as the pixels of the image, and of spatially modulated mask 56.

For the system described above, the frame buffer itself, of frame buffer and format module 78, is preferably divided into bit planes. Each bit plane is a planar array of bits, in which each bit corresponds to one pixel on spatially modulated mask 56. Each bit plane actually represents at least a part of the data for each color, such that if a pixel is to have a component which includes a particular primary color, that pixel is represented by a particular bit on the appropriate bit plane which features that primary color. The bit planes are arranged one below the other to form a three-dimensional arrangement of the data, from the most significant to the least significant bit. There are m×N bit planes (m is the number of bits/color channel, N is the number of color channels).

Timing system 66 can be considered to be an example of at least a portion of the converter of FIG. 3A above, more preferably in combination with multi-color transformation module 74, gamma correction module 76 and frame buffer and format module 78.

The data is usually presented as 8 bits (256 levels) per each of the seven primary colors. The various "gray levels" of the illumination can be achieved in different ways depending on the type of spatially modulated mask 56 which is used. For "analog" modulators, such as nematic LC modulators for example, the gray level is determined by the amount of the optical axis rotation, controlled by the voltage applied to the device. Each frame requires seven "updates", or changes to the configuration, of spatially modulated mask 56, with one update for each of the primary colors of color filters 52. For a frame refresh rate of 50 Hz for viewing screen 60, this corresponds to an update rate of 350 Hz. The eight bit planes corresponding to the relevant color are retrieved from the frame buffer itself, of frame buffer and format module 78, and are optionally and preferably transformed into analog signals. These analog signals are then amplified and applied to spatially modulated mask 56.

For the "binary" type of spatially modulated mask 56, such as digital micro-mirror devices (DMD) by Texas Instruments or Ferroelectric Liquid Crystal (FLC) SLM by MicroPix, Displaytech and other vendors, gray levels are achieved by pulse width modulation (PWM) of the light, a technique which is well known in the art. In order to perform pulse width modulation of the light, m bit planes, shown here for m=8 planes, for each primary color are loaded into spatially modulated mask 56 during the period for displaying the relevant color. For a frame rate of 50 Hz and a 7 color display, the time for each color to be displayed is 20 ms /7=2.85 ms (20 ms=1/50 Hz). During this time, 8 bit planes must be loaded into spatially modulated mask 56, resulting in an update rate of 2.8 kHz. However, if PWM is applied to the light, the least significant bit plane should be presented on spatially modulated mask 56 for only 11.2 microseconds.

To extend the display period and therefore to avoid such a rapid refresh or change rate for spatially modulated mask 56, optionally and preferably PWM is not applied to the light. Instead, the illumination time is preferably divided uniformly between the bit planes. The different bit values are then optionally and more preferably created by changing the brightness of light incident on spatially modulated mask 56. The brightness of the incident light is optionally and most preferably altered by using a continuously varying neutral density (ND) filter, as described in greater detail below.

Figure 4B:
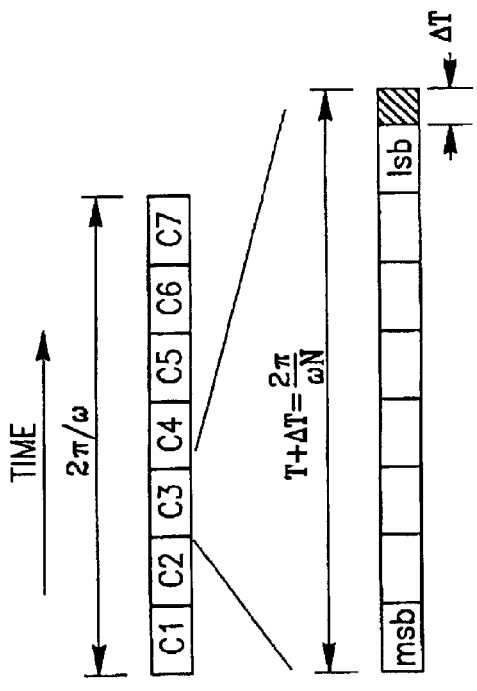
FIGS. 4A–4C illustrate an implementation of the present invention with an exemplary neutral density (ND) filter, with an illustrative implementation for the filter arrangement of the color wheel with such an ND filter (FIG. 4A), the timing sequence for operation of the color filter wheel (FIG. 4B), and a graph of the density of the ND filter (FIG. 4C)
Figure 4C:
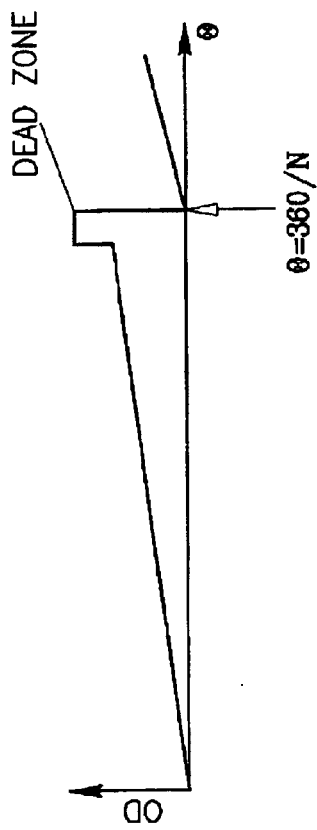
Figure 4A:
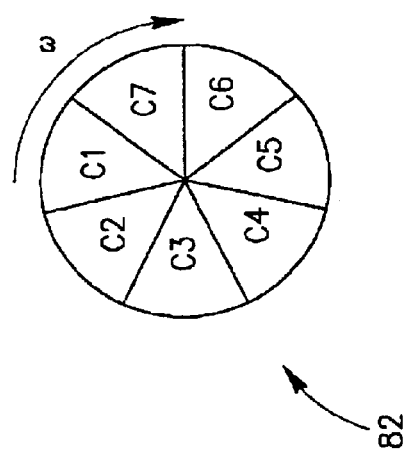

FIG. 4A shows an illustrative implementation for the filter arrangement of the color wheel with such an ND filter 82. The color filter wheel is divided into several color sections, labeled as "C1" to "C7" respectively, the width of each is $2\pi/N$ radians, where N is the number of primary colors. As described in greater detail below, each color section is a different color filter, which preferably has a separate ND filter. The ND filter does not affect the spectral content of the filtered light, but rather alters the intensity of the filtered light over the entire spectrum.

The timing sequence for operation of color filter wheel 82 is depicted in FIG. 4B. The duration of a full rotation of the color filter wheel is $2\pi/\omega$, each color section has a time slot of $2\pi/\omega N$, during which m bit planes are loaded into the spatially modulated mask. Each bit plane occupies equal time duration and at after the last significant bit loading, a dead zone exists. To achieve the correct dependence between light intensity and the corresponding bit value, a continuously varying ND filter is placed in each color section of filter 82. The density of the ND filter varies linearly with $\theta$ from zero density to a density of $m \cdot \log_{10} 2 \approx 0.3m$, m being the number of bits/channel, as shown in FIG. 4C. In the transition region (the dead zone), from the least significant bit (lsb) of one color to the most significant bit (msb) of the next color the density increases to a higher value to avoid color mixing. As shown below, this design ensures that the brightness of light deflected from i-bit plane has an almost linear dependence on the value of $i^{th}$ bit. A gamma-correction look-up table (LUT) compensates the remaining non-linearity as explained above.

The light intensity which passes through the ND filter, during the period of the $i^{th}$ bit (msb=0 bit, lsb=m−1 bit) is given by:

$$\frac{I_{AVG}(i)}{I_0} = \frac{1}{T + \Delta T} \int_{\frac{iT}{m}}^{(i+1)\frac{T}{m}} 10^{-\frac{0.3mt}{T}} dt =$$

-continued $$\frac{T}{0.3m \ln 10 (T + \Delta T)} 10^{-0.3i} (1 - 10^{-0.3}) = \frac{\frac{1}{2}}{m \ln 2 \left(1 + \frac{\Delta T}{T}\right)} \frac{1}{2^i}$$

Here $T+\Delta T$ is the duration of color section, where $\Delta T$ is the time of the dead zone. It is evident that the ratio between the average intensities in two following bits is indeed 2. A similar relationship is also obtained when the ND filter has a density of 0.22 during the msb period, after which the density increases linearly from zero to 0.3(m−1), while the timing sequence stays the same.

Other optional implementations for varying the brightness of the light are also possible and are encompassed within the scope of the present invention. For example, a varying wheel of neutral density filters could optionally be placed after the color filter wheel. This ND filter wheel would rotate synchronously with the color filter wheel, so that the ND filter wheel completes seven turns during one turn of the color wheel.

Another optional implementation would use an electronically controlled LC or Electro-optic light intensity modulator after the color filter wheel. Such a device controls the brightness of the filtered light through an electronic (digital) control. One example of such a device is the LC modulator from CRL Opto (United Kingdom). As another option, an electronic shutter system could be placed as an aperture controlling the amount of light arriving to the SLM, or passing from the SLM to the screen.

The intensity of the light source could also optionally be altered, by modulating it in time. For example, the light source could optionally be implemented as a flash lamp, which emits light in bursts or "flashes". The light then decays with time, such that the brightness of the light decreases over time. This decrease enables the intensity or brightness of the light to be altered without a neutral density filter. Alternatively, in a similar system with a flash lamp, the lamp could optionally also emit flashes of light with a high repetition rate, such that the number of pulses per unit of time would determine the brightness of the emitted light.

Figure 5A:
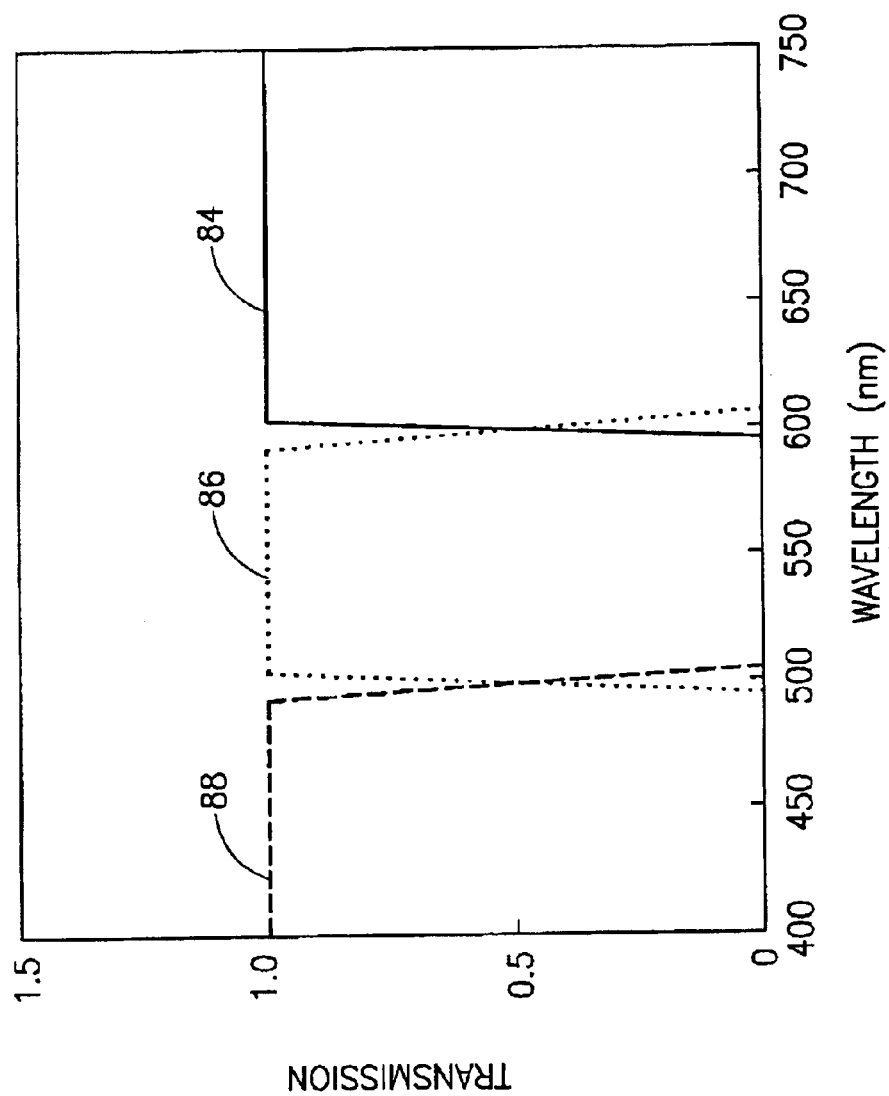
FIGS. 5A and 5B illustrate the different spectra of a typical RGB background art system (FIG. 5A) and of an exemplary implementation according to the present invention with six colors (FIG. 5B)
Figure 5B:
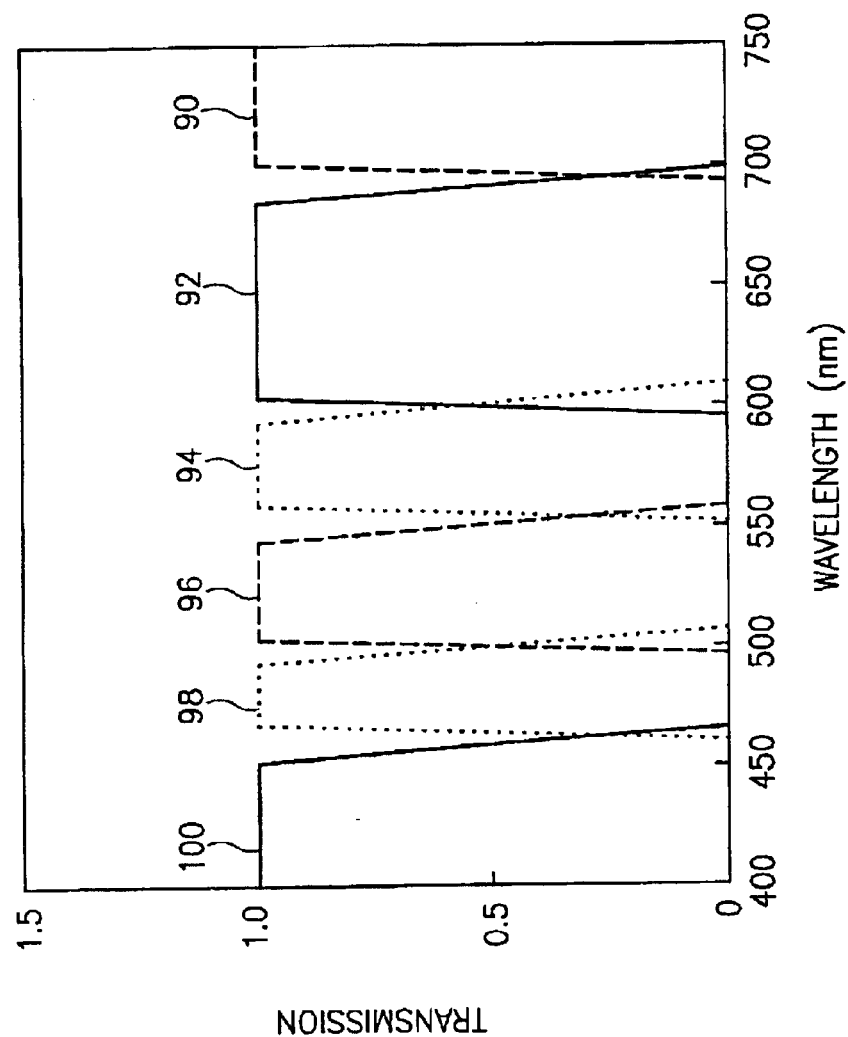

FIGS. 5A and 5B show transmission spectra for the background art RGB system (FIG. 5A) and for an exemplary color system according to the present invention with six colors (FIG. 5B). As shown in FIG. 5A, the transmission spectra of RGB filters, shown as spectra 84 (red), 86 (green) and 88 (blue), which are clearly highly limited and cannot provide wide coverage for the gamut of colors which are displayed. FIG. 5B shows the transmission spectra of the six color system, shown as spectra 90, 92, 94, 96, 98, and 100. These spectra are obtained by halving the spectral range of each of the RGB filters with spectra as shown in FIG. 5A. The pair of filters 90 and 92 cover the same spectral range of the wider filter 84, and so forth, thereby increasing the possible gamut of colors which can be covered. The selection of the number of primary colors is preferably performed according to a balance between the desirability of adding more primary colors, which increases the possible gamut of displayable colors, and the increased complexity of adding more colors.

Figure 2:
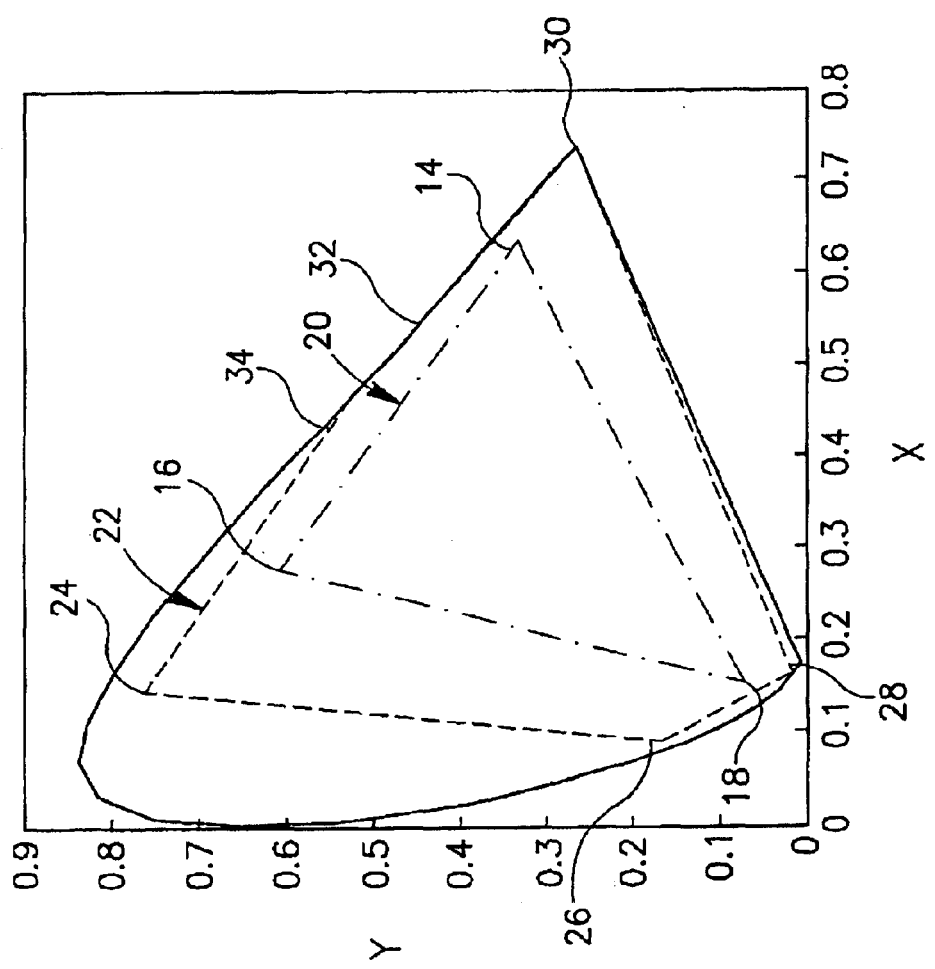
FIG. 2 is a chromaticity diagram showing a color gamut for a typical phosphor set according to the background art and also showing an exemplary expanded color gamut according to the present invention.

The spectra of FIG. 5B correspond to hexagon 22 (FIG. 2), with points 24, 26, 28, 30, 32 and 34, which shows the increased size of the gamut of colors provided by more than four colors, as compared to the gamut produced by RGB phosphors (triangle 20 of FIG. 2).

Figure 6A:
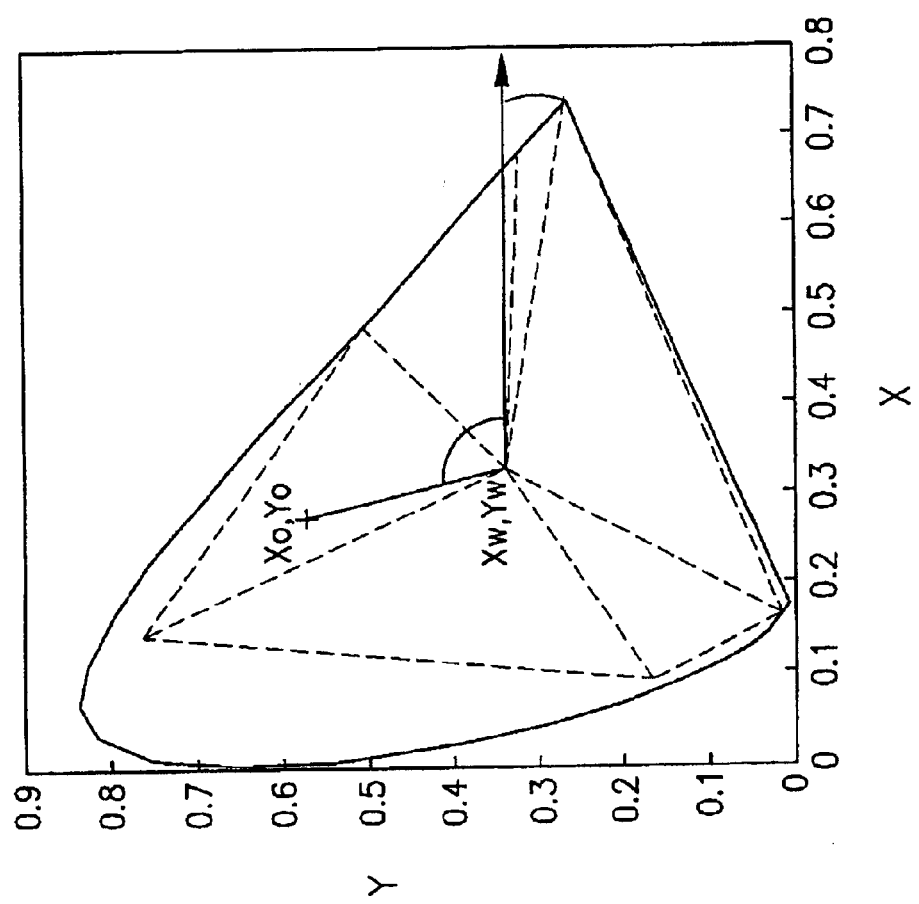
FIG. 6A and 6B illustrates a method for converting image data from the background three-color RGB format to an exemplary format according to the present invention.
Figure 6B:
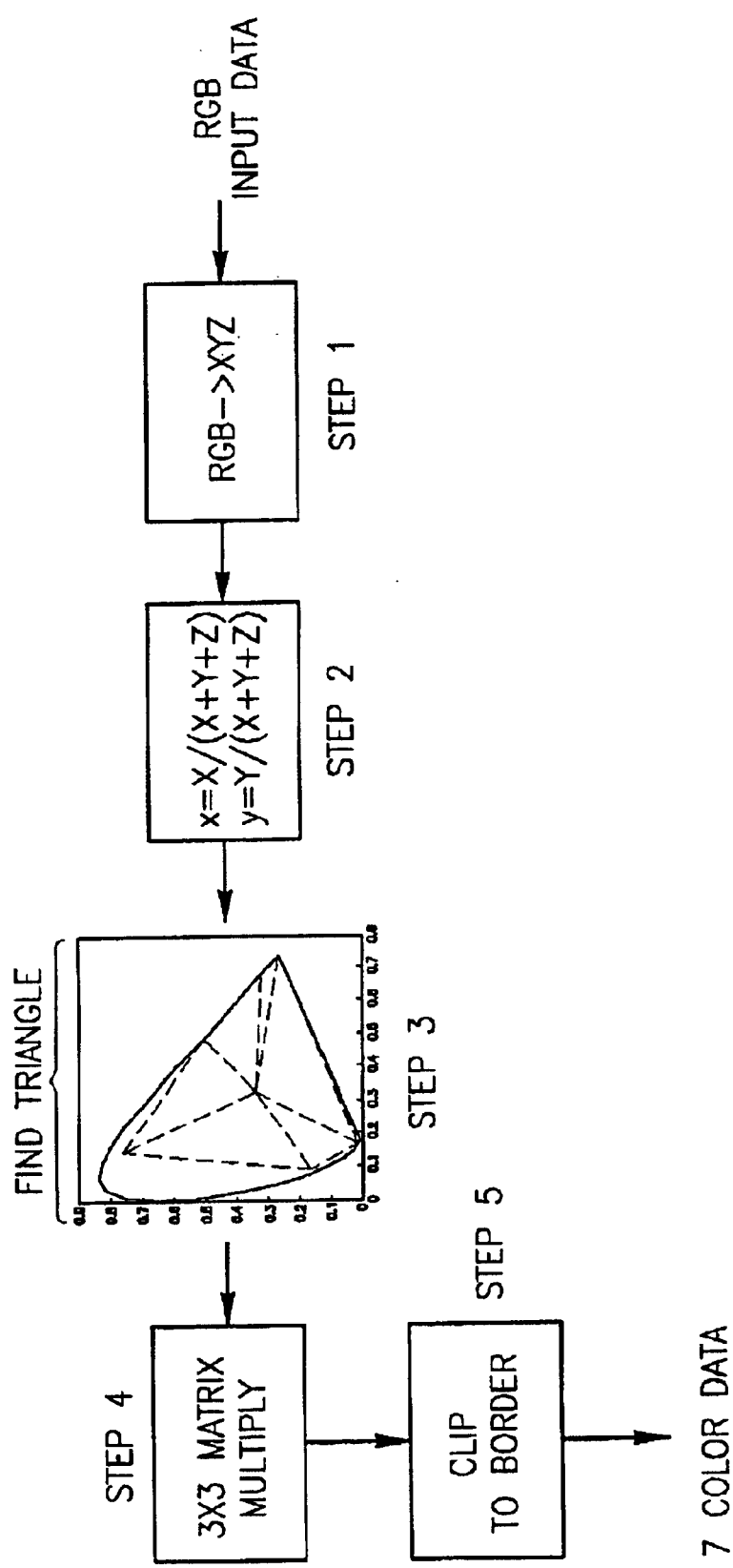

However, most electronic image data is given in an RGB or RGB related format, according to some function of the RGB format. The use of such data with the present invention, which features at least four colors, requires the data to be transformed into a format which is suitable for the present invention. One optional method for such data transformation is described in FIGS. 6A and 6B. For the purposes of description only and without any intention of being limiting, a six plus one color implementation of the system of the present invention is used, with the six primary color filters defined above and a white light filter. This arrangement creates six triangles in the color gamut of the display. As explained with regard to the exemplary method in the flowchart of FIG. 6B, an RGB signal arriving from the input is transformed into XYZ coordinate space in step 1, by using a 3×3 matrix transformation as well known in the art. The projection on the x-y chromaticity plane is calculated from the XYZ coordinates in step 2. The position of the input point ($x_0$, $y_0$) lies within one of the sectors as shown in FIG. 6B. To determine in which sector the point should appear, the angle of the point $\phi$ with respect to the most reddish primary as a reference is calculated, taking the white point as an origin in step 3:

$$\phi = \phi_0 + \phi_R = tg^{-1}[(y_0-y_w)/(x_0-x_w)] - tg^{-1}[(y_R-y_w)/(x_R-x_w)]$$

where the sign of the tangent is determined by comparing the relevant y coordinate with $y_w$. After determining the angle $\phi$, it is compared with the angles $\phi_i$ (i=1–6) of all primaries to determine in which sector the input. data point appears. After this is calculated, the three primaries at the triangle corners (namely, the white and two out of the six other colors which are at the corners of the relevant triangle) to create the additive linear combination representing the input data:

$$\begin{pmatrix} X_0 \\ Y_0 \\ Z_0 \end{pmatrix} = a_w \begin{pmatrix} X_w \\ Y_w \\ Z_w \end{pmatrix} + a_1 \begin{pmatrix} X_1 \\ Y_1 \\ Z_1 \end{pmatrix} + a_2 \begin{pmatrix} X_2 \\ Y_2 \\ Z_2 \end{pmatrix}$$

In step 4, the parameters ($a_w$, $a_1$, $a_2$) of the combination are given by:

$$\begin{pmatrix} a_w \\ a_1 \\ a_2 \end{pmatrix} = \begin{pmatrix} X_w X_1 X_2 \\ Y_w Y_1 Y_2 \\ Z_w Z_1 Z_2 \end{pmatrix}^{-1} \begin{pmatrix} X_0 \\ Y_0 \\ Z_0 \end{pmatrix}$$

The XYZ matrix can be inverted if the three primary vectors do not lie on the same plane. If one of the parameters ($a_w$, $a_1$, $a_2$) is negative, the input point lies outside the gamut, in step 5. In this case the negative value can be set to zero. These steps produce the resultant seven color (six color plus white light for brightness) data.

The method described above is only one possible way to transform the RGB data to a format suitable for a display with at least four colors. In particular, regarding the detailed procedure, it is not essential to include white light as one of the primaries. The procedure only requires the definition of a set of triangles, which are based on the existing primaries and any set of additional primaries, which can be composed from the other primaries. For example, the white color primary could be replaced with a definition of the white point as being composed of equal amounts of each of the six primaries.

Figure 7:
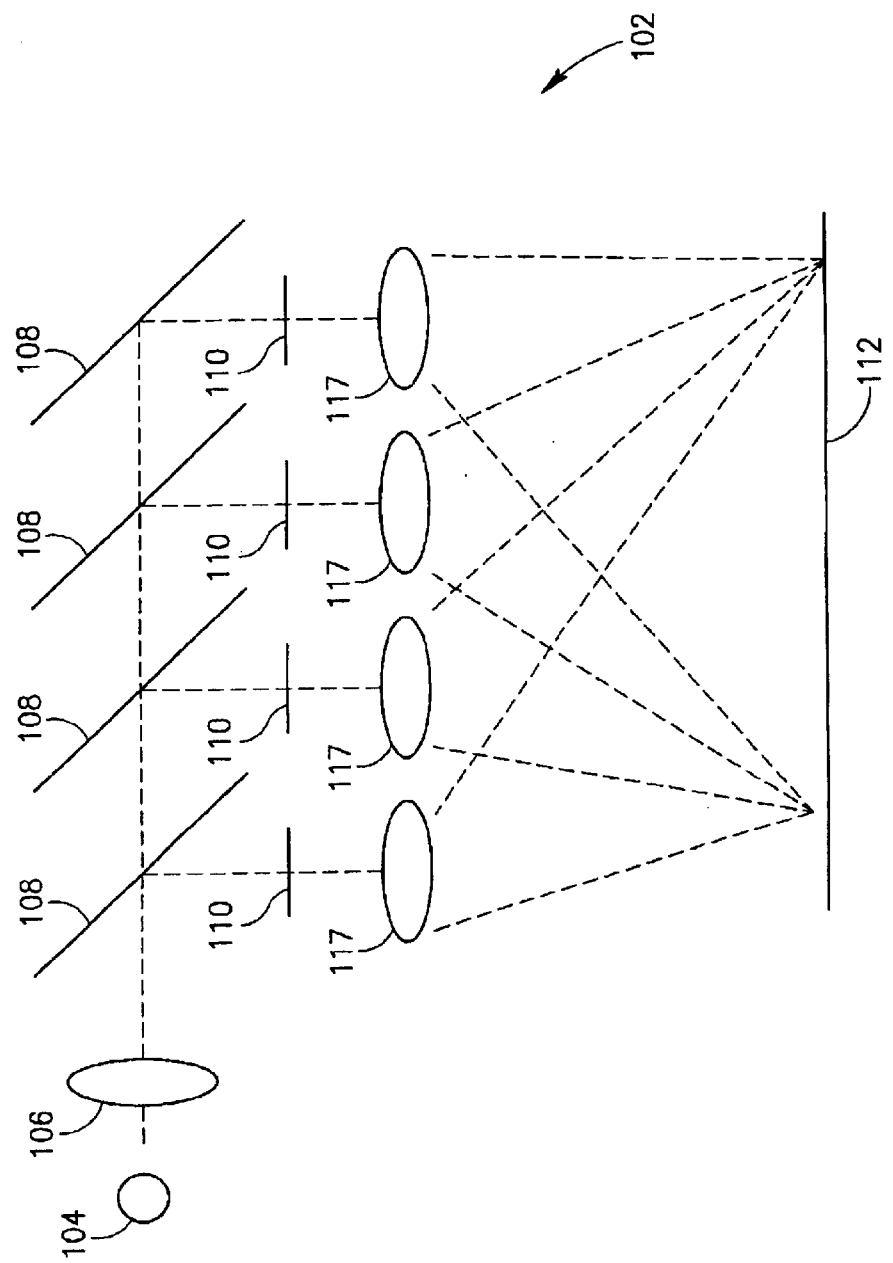
FIG. 7 illustrates an additional exemplary embodiment of the present invention.

As shown with regard to FIG. 7, another optional embodiment of the system of the present invention is preferably based upon a simultaneous projection scheme. In a system 102, a white light source 104 produces a white light beam. The light beam is passed through a collimating lens 106 for collecting and focusing the light. Next, the light is passed through a plurality of dichroic mirrors 108. Preferably, one dichroic mirror 108 is used for each desired primary color. Four such dichroic mirrors 108 are shown for the purposes of description only and without any intention of being limiting. Each dichroic mirror 108 passes part of the light spectrum and reflects the remaining part of the light spectrum, thereby acting as a filter to produce light of each desired primary color.

Next, a plurality of SLM (spatial light modulators) 110 is used. Each SLM 110 is then used to modulate each of the beams according to the data of the image which is to be produced. The beams may optionally be combined before projection, but preferably are projected on a display screen 112, as shown. For the latter implementation, the beams are combined at display screen 112. The integration of beams is done on display screen 112 simultaneously.

Optionally and more preferably, each SLM 110 has an associated imaging lens 117 for focussing the beam on display screen 112 as the beam passes through SLM 110. Each imaging lens 117 is preferably positioned away from the axis of the beam of light after passing through SLM 110, such that the combined beams of light appear to be in registration on display screen 112. Alternatively, mirrors could optionally be used for placing the beams of light in registration, and/or the angle of each SLM 110 could optionally be adjusted in order to adjust the angle of the beam of light as it exits each SLM 110.

According to another embodiment, the light from the white light source is split into a plurality of beams. The beam splitting can optionally be performed by dispersing the light through a prism/grid and collecting the relevant parts of the spectrum. Alternatively, the white light can be split without dispersion into a plurality of beams, after which each beam is filtered to create each of the relevant colors. Also alternatively, a suitable arrangement of dichroic mirrors/filters may optionally be used.

A similar implementation is optionally and preferably based on seven CRT (cathode ray-tubes) with suitable phosphors or black-and-white CRT with suitable filters that are projected onto a screen and combined there in registration as in three-primary CRT (cathode-ray tube) projectors (for example, Reality 800 series of products from Barco Inc.).

While the invention has been described with respect to a limited number of embodiments, it will be appreciated that many variations, modifications and other applications of the invention may be made.

What is claimed is:

1. A device for displaying a color image comprising:
   a light source to selectively produce light of at least four different,
   a polychromatic source; and
   a color rotating mechanism able to sequentially place at least four color filters, each color filter corresponding to one of said at least four primary colors, in the path of polychromatic light from said polychromatic source at a rotating rate equal to a rate of the frame frequency at which said color image to be displayed is to be refreshed, such that light of all of said at least four primary colors is produced in each rotation of said color rotating mechanism; and
   a controller to receive image data representing said color image in terms of said at least four primary colors and, based on said image data, to produce a light pattern corresponding to said color image by selectively controlling the path of light of said at least four primary colors, wherein at least one of said at least four primary colors is not an exact complementary of any of the other primary colors.

2. The device of claim 1 further comprising at least one optical element which projects said light pattern onto a viewing screen.

3. The device of claim 1, wherein said color rotating mechanism comprises:
a color wheel for holding said at least four color filters; and
a motor for rotating said color wheel at said rotating rate.

4. The device of claim 1 wherein the controller comprises a spatial light modulator which selectively modulates the light of said at least four primary colors in accordance with said image data.

5. The device according to claim 4, wherein said light source sequentially produces light of said at least four primary colors at said rotating rate, and wherein said spatial light modulator sequentially modulates the light of said at least four primary colors based on said color image data at said rotating rate.

6. The device of claim 4, where said spatial light modulator is selected from the group consisting of a binary modulation type and a continuous modulation type.

7. The device of claim 6, wherein said spatial light modulator is selected from the group consisting of deformable micro-mirror device (DMD), Ferroelectric liquid crystal (FLC) device, quantum well modulator, and electro-optical modulator.

8. The device of claim 6, wherein said spatial light modulator is selected from the group consisting of liquid crystal device (LCD), electro-optical modulator and magneto-optical modulator.

9. The device of claim 1, wherein said light source comprises a continuously variable neutral density filter for controlling the brightness of the light of said at least four primary colors.

10. The device of claim 1, wherein said light source selectively produces light of at least five primary colors.

11. The device of claim 10, wherein said light source selectively produces light of at least six primary colors.

12. The device of claim 1, wherein said light source additionally produces white light affecting the brightness of said image.

13. The device of claim 1 wherein said image data comprises digital image data.

14. The device of claim 1 wherein said image data comprises analog image data.

15. The device of claim 1 wherein the wavelength ranges of said at least four primary colors are selected to produce a desired color gamut for said color image.

16. A system for displaying a color image, the system comprising:
a light source to selectively produce light of at least four different non-white and non-black, primary colors, said light source comprising a polychromatic source and a color rotating mechanism able to selectively place at least four color filters, each color filter corresponding to one of said at least four primary colors, in the path of polychromatic light from said polychromatic source at a rotating rate equal to a rate of the frame frequency at which said color image to be displayed is to be refreshed, such that light of all of said at least four primary colors is produced in each rotation of said rotating mechanism;
a converter to convert three-primary-color input data representing said color image into converted image data representing said color image in terms of said at least four primary colors; and
a controller to produce a light pattern corresponding to said color image by selectively controlling the path of light of said at least four primary colors based on said converted image data,
wherein at least one of said at least four primary colors is not an exact complementary of any of the other primary colors.

17. A system according to claim 16 wherein said three-primary-color input data comprises related to red-green-blue (RGB).

18. The system of claim 16 wherein the wavelength ranges of said at least four primary colors are selected to produce a desired color gamut for said color image.

19. A method for displaying a color image comprising:
selectively producing light of at least four different, non-white and non-black primary colors;
converting three-primary-color input data representing said color image into converted image data representing said color image in terms of said at least four primary colors; and
selectively controlling the path of light of said at least four primary colors based on said converted image data to produce a light pattern corresponding to said color image,
wherein at least one of said at least four primary colors is not an exact complementary of any of the other primary colors, and wherein selectively producing the light of said at least four primary colors comprises selectively filtering polychromatic light using at least four color filters, each color filter corresponding to one of said at least four primary colors, at a rate equal to a rate of the frame frequency at which said color image be displayed is to be refreshed.

20. A method according to claim 19 wherein said three-primary-color input data comprises red-green-blue (RGB) input data.

21. The method of claim 19 wherein the wavelength ranges of said at least four primary colors are selected to produce a desired color gamut for said color image.

22. A device for projecting a color image comprising:
a light source to sequentially produce light of at least four different, non-white and non-black, primary colors, the light source comprising a polychromatic source and at least four color filters, each color filter adapted to filter polychromatic light from said polychromatic source to produce the light of one of said at least four primary colors, and a color rotating mechanism able to sequentially place said at least four color filters in the path of polychromatic light from said polychromatic source at a rotating rate equal to a rate of the fame frequency at which said color image to be displayed is to be refreshed, such that light of all of said at least four primary colors is produced in each rotation of said color rotating mechanism;
a controller to receive image data representing said color image in terms of said at least four primary colors and, based on said image data, to produce a light pattern corresponding to said color image by selectively controlling the path of light of said at least four primary colors, said controller comprising a spatial light modulator to sequentially modulate the light of said at least four primary colors in accordance with said image data; and at least one optical element to project said light pattern, wherein at least one of said at least four primary colors is not an exact complementary of any of the other primary colors.

23. The device of claim 22 wherein the wavelength ranges of said at least four primary colors are selected to produce a desired color gamut for said color image.

24. A device for displaying a color image comprising:

a light source comprising a polychromatic source and at least four color filters, each color filter adapted to filter polychromatic light from said polychromatic source to produce light of one of at least four different, non-white and non-black, primary colors, and a color rotating mechanism able to sequentially place said at least four color filters in the path of polychromatic light from said polychromatic source at a rotating rate equal to a rate of the frame frequency at which said color image to be displayed is to be refreshed, such that light of all of said at least four primary colors is produced in each rotation of said color rotating mechanism; and a controller to receive image data representing said color image in terms of said at least four primary colors and, based on said image data, to produce a light pattern corresponding to said color image by selectively controlling the path of light of said at least four primary colors, wherein at least one of said at least four primary colors is not an exact complementary of any of the other primary colors.

* * * * *

UNITED STATES PATENT AND TRADEMARK OFFICE
CERTIFICATE OF CORRECTION

PATENT NO. : 6,870,523 B1
DATED : March 22, 2005
INVENTOR(S) : Ben-David, Ilan

It is certified that error appears in the above-identified patent and that said Letters Patent is hereby corrected as shown below:

<u>Column 14,</u>
Line 51, after "different" please add -- non-white and non-black, primary colors, said light source comprising: --.

<u>Column 16,</u>
Line 54, please replace "fame" with -- frame --.

Signed and Sealed this

Twenty-first Day of June, 2005

JON W. DUDAS
*Director of the United States Patent and Trademark Office*